A. RICE.
Rotary Stool.

No. 164,483.  Patented June 15, 1875.

WITNESSES:
A. W. Almquist
A. F. Terry

INVENTOR:
Aaron Rice
BY
ATTORNEYS.

UNITED STATES PATENT OFFICE.

AARON RICE, OF FITCHBURG, MASSACHUSETTS, ASSIGNOR TO WALTER HEYWOOD CHAIR COMPANY, OF SAME PLACE.

IMPROVEMENT IN ROTARY STOOLS.

Specification forming part of Letters Patent No. 164,483, dated June 15, 1875; application filed May 8, 1875.

*To all whom it may concern:*

Figure 1:
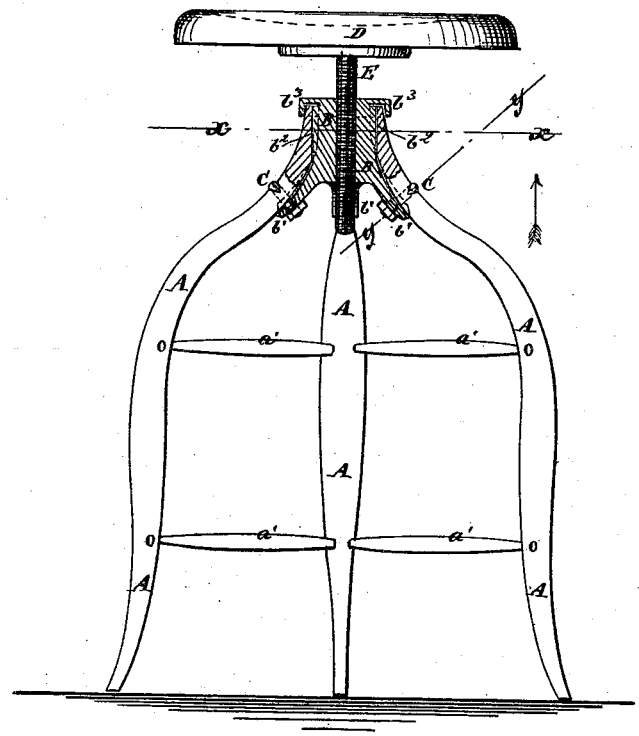
Figure 2:
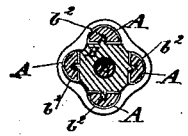
Figure 3:

Be it known that I, AARON RICE, of Fitchburg, Worcester county, Massachusetts, have invented a new and useful Improvement in Rotary Stools, of which the following is a specification:

Figure 1 is a detail vertical section of my improved stool. Fig. 2 is a horizontal section of the same taken through the line $x\ x$, Fig. 1; and Fig. 3 is a detail section taken through the line $y\ y$, Fig. 1.

Similar letters of reference indicate corresponding parts.

The object of this invention is to furnish an improved rotary stool, whether made with a screw or pivot, which shall be simple in construction, strong and durable, and less liable to break than when made in the usual way. The invention consists in the socket, provided with the grooved arms, the ribs or grooves, and the recessed flange, to adapt it to receive the legs and the screw or pivot of the seat, as hereinafter fully described.

A are the legs of the stool, which are connected together by rounds $a'$, in the usual way. The middle parts of the legs A are nearly vertical, and their upper parts are curved inward and upward to bring them into proper position to be attached to the socket B. The socket B is made with as many downwardly and outwardly projecting arms $b^1$ as the stool has legs A. The upper or outer sides of the arms $b^1$ are grooved or concaved longitudinally to receive and fit upon the legs A. The sides of the socket B, above and in line with the arms $b^1$, have ribs $b^2$ formed upon them to enter longitudinal grooves in the inner sides of the upper ends of the legs A, or have grooves formed in them to receive the upper parts of the said legs. Around the top of the socket B is formed an outwardly-projecting flange, in the under side of which, and in line with the arms $b^1$ and ribs $b^2$, are formed recesses or sockets to receive the ends of the legs A. The legs A are further secured in place by bolts C, which pass through the legs A, and through the arms $b^1$, and have nuts screwed upon their inner ends. Upon the outer ends of the bolts C are formed crossheads, so formed as to fit upon and clasp the outer sides of the said legs A, as shown in Figs. 1 and 3. D is the seat, to the under side of which is attached the screw E, which passes down through a screw-hole formed longitudinally through the center of the socket B. In the case of a pivot-chair, a yoke or step should be cast upon the lower part of the socket B to receive the end of the said pivot.

Having thus described my invention, I claim as new and desire to secure by Letters Patent—

The socket B, provided with the grooved arms $b^1$, the ribs or grooves $b^2$, and the recessed flange $b^3$, to adapt it to receive the legs A, and the screw or pivot of the seat D, substantially as herein shown and described.

AARON RICE.

Witnesses:
C. H. POTTER,
GEO. H. SPENCER.